(12) United States Patent
McClure et al.

(10) Patent No.: US 8,240,117 B1
(45) Date of Patent: Aug. 14, 2012

(54) PICKUP HELPER FEEDING ROLL

(75) Inventors: John R. McClure, New Holland, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/042,345

(22) Filed: Mar. 7, 2011

(51) Int. Cl.
*A01D 39/00* (2006.01)
*A01D 43/02* (2006.01)
*A01D 75/00* (2006.01)

(52) U.S. Cl. .......................................................... 56/341

(58) Field of Classification Search .................... 56/341, 56/343, 344, 345, 350, 364
See application file for complete search history.

(56) References Cited

U.S. PATENT DOCUMENTS

| | | | |
|---|---|---|---|
| 5,479,766 A | 1/1996 | Ransom | |
| 5,595,055 A | 1/1997 | Horchler et al. | |
| 5,848,523 A | 12/1998 | Engel et al. | |
| 6,279,304 B1 | 8/2001 | Anstey et al. | |
| 6,601,375 B1 * | 8/2003 | Grahl et al. | 56/16.6 |
| 6,651,418 B1 * | 11/2003 | McClure et al. | 56/341 |
| 6,874,311 B2 | 4/2005 | Lucand et al. | |
| 6,948,300 B1 * | 9/2005 | Bandstra et al. | 56/341 |
| 7,204,074 B2 * | 4/2007 | Bandstra et al. | 56/341 |
| 7,694,504 B1 * | 4/2010 | Viaud et al. | 56/341 |
| 8,056,314 B1 * | 11/2011 | Anstey et al. | 56/364 |
| 2010/0242427 A1 | 9/2010 | Anstey et al. | |

FOREIGN PATENT DOCUMENTS

| | | |
|---|---|---|
| DE | 019501382 A1 | 7/1996 |
| EP | 000116514 A1 | 8/1984 |
| EP | 001306003 A1 | 5/2003 |

* cited by examiner

*Primary Examiner* — Arpad Fabian-Kovacs
(74) *Attorney, Agent, or Firm* — Patrick M. Sheldrake

(57) ABSTRACT

A crop pickup apparatus for a round baler in which the pickup apparatus substantially wider than the bale chamber inlet opening. The pickup includes a pair of large crop converging augers situated along a common axis, one each on opposing sides of the crop inlet, and forwardly adjacent to the bale chamber infeed throat. The pickup apparatus also include a secondary crop feeding roll having a plurality of generally radially extending fingers that upwardly extend into the crop mat in an area adjacent to the converging augers to convey crop material from a forwardly disposed pickup tine reel to the inlet opening. The fingers are arranged to partially overlap with tines on the tine reel so that the crop material is generally continuously urged along the entire longitudinal feed path into the inlet opening.

13 Claims, 5 Drawing Sheets

PICKUP HELPER FEEDING ROLL

BACKGROUND OF THE INVENTION

The present invention relates generally to a baler for forming cylindrical bales of crop material, commonly referred to as a round baler, and more particularly to an improvement in a crop pickup apparatus for a round baler having lateral converging apparatus working in conjunction with a pickup that is wider than the bale forming chamber inlet.

Round balers rely on a pickup apparatus with a set of tines that engage a windrow of crop material on the ground and lift it upwardly and then urge it rearwardly to a transverse infeed opening into a bale-forming chamber. Pressure to increase efficiency in crop packaging operations has resulted in the prevalence of crop pickup units that are significantly wider than the bale forming chamber into which the crop material is fed. A wider pickup allows the baler to handle wider crop windrows and also results in better crop fill at the lateral extremes of the resultant bale. Historically, wide pickups have incorporated augers situated at the extremes of the pickup width to converge the crop laterally inwardly to achieve a width of the crop mat being fed into the bale chamber that is approximately the same as the chamber width. Longitudinal space for the converging augers generally requires an elongated feed table, increasing the distance the crop must travel between the pickup tines and the bale chamber inlet opening. A secondary feed mechanism, such as a stuffer or rotor, is often necessary to convey the converged crop mat along the lengthened feed table and into the bale chamber.

Although quite effective, secondary feed mechanisms often add complexity and cost. Without them, the potential for clogging the bale chamber infeed opening increases. Efforts to eliminate the secondary feed mechanism have focused on minimizing the distance between the pickup tines and the crop inlet opening. While such designs may reduce the need for a secondary feed mechanism, the benefits may be offset by the increased complexity in the converging apparatus and/or the pickup apparatus as it becomes necessary to alter tine extension as the tines rotate on the reel.

It would be a great advantage to provide a simple secondary feed mechanism for use on a round baler having a pickup unit substantially wider than the bale forming chamber that could interact with the existing tine reel and converging apparatus to efficiently convey crop material from the ground to the bale-forming chamber with reduced incidence of clogging that overcomes the above problems and limitations.

SUMMARY OF THE INVENTION

Accordingly, the present invention, in any of the embodiments described herein, may provide one or more of the following advantages:

It is an object of the present invention to provide a crop pickup unit for use on a round baler that incorporates a secondary feed roll disposed beneath the feed table and having a plurality of radially arranged fingers that extend into the crop flow to urge crop between the pickup tines and the baler inlet opening.

It is a further object of the present invention to provide a crop pickup unit having a secondary crop conveying apparatus in which a plurality of generally radially arranged fingers intermesh with tines on the pickup tine reel to continuously urge crop material from the pickup tine to the bale chamber infeed throat opening.

It is a further object of the present invention to provide a crop pickup assembly that is substantially wider than the bale chamber inlet opening and incorporates a simple secondary crop conveyor longitudinally disposed between a forwardly disposed pickup tine reel and the inlet opening and laterally disposed between opposing lateral crop convergers to urge the converged crop into the bale chamber inlet and reduce the incidence of crop jamming.

It is a still further object of the present invention to provide a crop pickup assembly having a simple secondary feed apparatus for a round baler that is durable in construction, inexpensive of manufacture, carefree of maintenance, easily assembled, and simple and effective to use.

These and other objects are achieved by providing an improved crop pickup apparatus for a round baler in which the pickup apparatus substantially wider than the bale chamber inlet opening. The pickup includes a pair of large crop converging augers situated along a common axis, one each on opposing sides of the crop inlet, and forwardly adjacent to the bale chamber infeed throat. The pickup apparatus also include a secondary crop feeding roil having a plurality of generally radially extending fingers that upwardly extend into the crop mat in an area adjacent to the converging augers to convey crop material from a forwardly disposed pickup tine reel to the inlet opening. The fingers are arranged to partially overlap with tines on the tine reel so that the crop material is generally continuously urged along the entire longitudinal feed path into the inlet opening.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel "Upward" and "downward"

orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
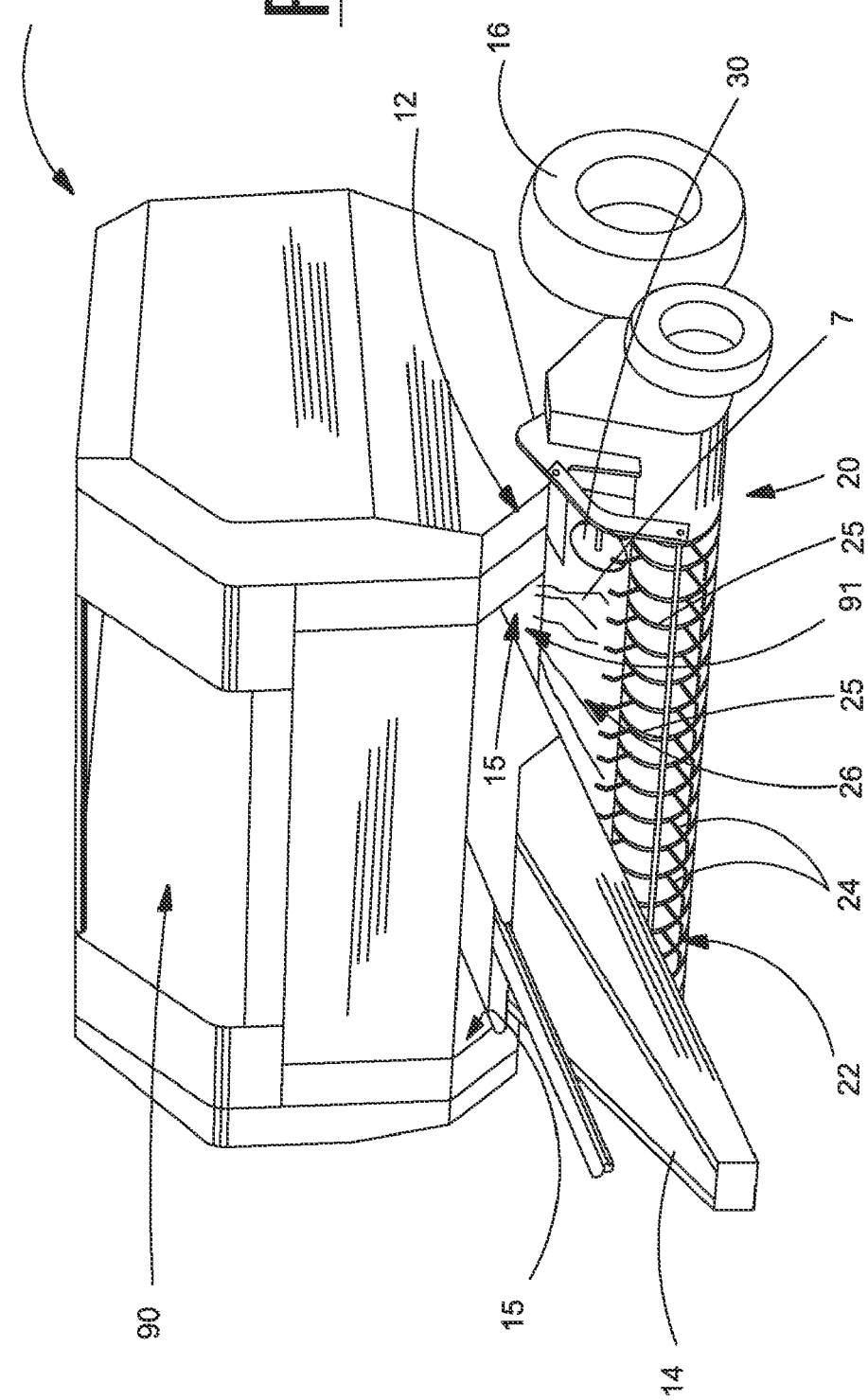
FIG. 1 shows an front perspective view of an agricultural round baler of the type on which the present invention is useful.
Figure 2:
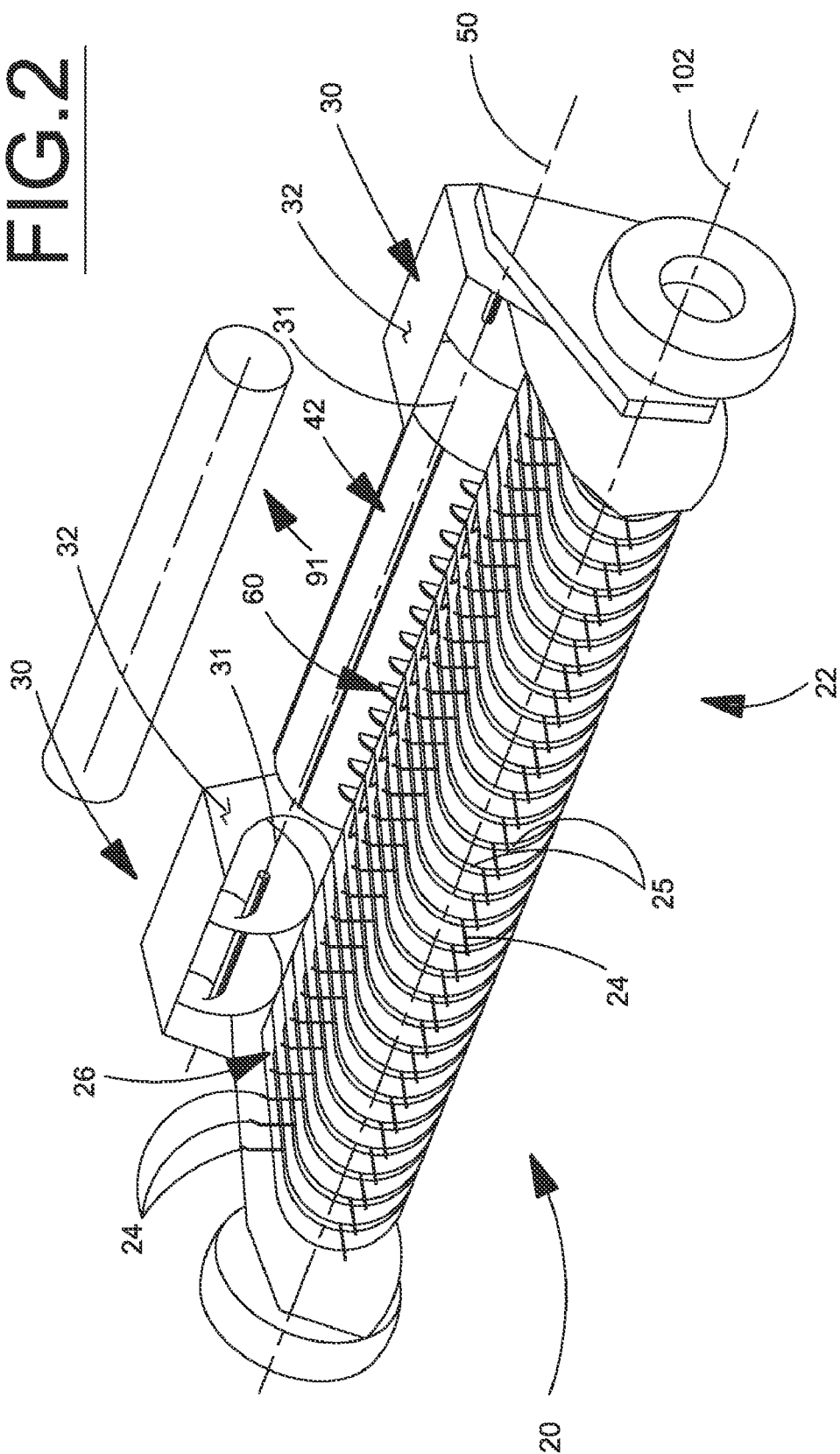
FIG. 2 is a partial perspective view of the pickup assembly used on the round baler in FIG. 1.

FIG. 1 illustrates a round baler 10 having a frame 12, a hitch 14, a pickup assembly 20, a bale-forming chamber 90 and a pair of supporting wheels 16 (only one shown) enabling the baler to be towed along the ground by a tractor or other similar prime mover and gather crop material from the ground for packaging. As is well known, the bale chamber is defined by a plurality of rolls and movable belts which act upon incoming crop material to spirally wind the crop material into a generally cylindrically-shaped bale. As baler 10 is towed across a field, pickup tines 24 mounted on a rotating tine reel 22 lift the crop material, usually in a windrow, from the ground and move the crop material onto a crop feeding transition area, referred to herein as the feed table 26, at the rearward portion of pickup assembly 20. The feed table features a series of generally parallel, longitudinally extending openings 25 through which the tines 24 project. The feed table 26 guides crop material away from the tine reel 22 mechanism and establishes a generally planar path along which the incoming crop mat is directed to the crop inlet opening. Tine reels 22 typically include one or more cams to alter the angle of the tines 24 as the tine rotates about a tine reel axis 102 (see FIG. 2) to improve crop pickup from the ground and also to accelerate the crop material rearwardly along the feed table 26 toward the bale chamber inlet opening 91. The resulting incoming crop mat 7 extends generally across the entire width of the pickup, assuming sufficient crop material in the windrow, as it moves rearwardly.

Now referring to FIGS. 2 through 5 in connection with FIG. 1, the inlet opening 91 to the bale chamber is laterally bounded by the side walls 15 of the bale chamber 90. A starter roll 44 bounds the top of the inlet opening while a floor roll 42 bounds the bottom of the inlet opening. The inlet opening 91 is characterized as the position, moving in the direction of the incoming crop mat along the feed table, at which the crop material becomes engaged by rotating action of the floor 42 and starter rolls 44, and the rotation of the bale in the bale chamber. While the above description describes the upper and lower boundaries of the inlet openings as transversely arranged rolls, the present invention is equally beneficial on balers on which one or both rolls are replaced with moving belts as is well known in the art.

It is common to provide a pickup assembly 20 that is wider than the inlet opening 91 in order to improve crop gathering efficiency. In such instances, a crop converging apparatus 30 is typically provided to laterally urge crop from the portions of the pickup assembly outboard of the inlet opening inwardly toward the inlet opening 91 of the bale chamber. The converging apparatus 30 urges crop material laterally inwardly to establish a mat of crop material having a width matching that of the inlet opening and desired bale width, typically around four or five feet. In the embodiment shown herein, the converging apparatus 30 comprises a pair of augers 31 arranged on a common transverse axis 50, each partially surrounded by a crop deflecting shield 32 to guide the crop material into contact with the augers. The converging augers 31 are positioned to fold the outboard portion of the crop mat inwardly so that the outboard crop material may be directed into the narrow bale chamber inlet opening.

The addition of a converging apparatus 30 typically requires that the feed table 26 be longitudinally elongated in order to provide the necessary space for the converging apparatus 30 between the tine reel 22 and the bale chamber inlet 91. Many balers employ cams and linkages on the tine reels to vary the radial extension of the tines based upon rotational position of the tine reel. The tines are retracted inwardly toward the tine rotational centerline as they approach the outboard converging apparatus to prevent contact with the converging mechanism and allow the feed table length to be reduced. Similarly, cams can be used to cause the tine tips to accelerate rearwardly slightly prior to moving beneath the feed table to propel the crop mat toward the inlet opening. Another approach as provided in the present invention is to provide a secondary feeding apparatus 60 in the longitudinal space between the tine reel 22 and the floor roll 42 to assist in conveying the crop mat rearwardly from the pickup assembly 20 toward the inlet opening 91 of the bale chamber.

Figure 3:
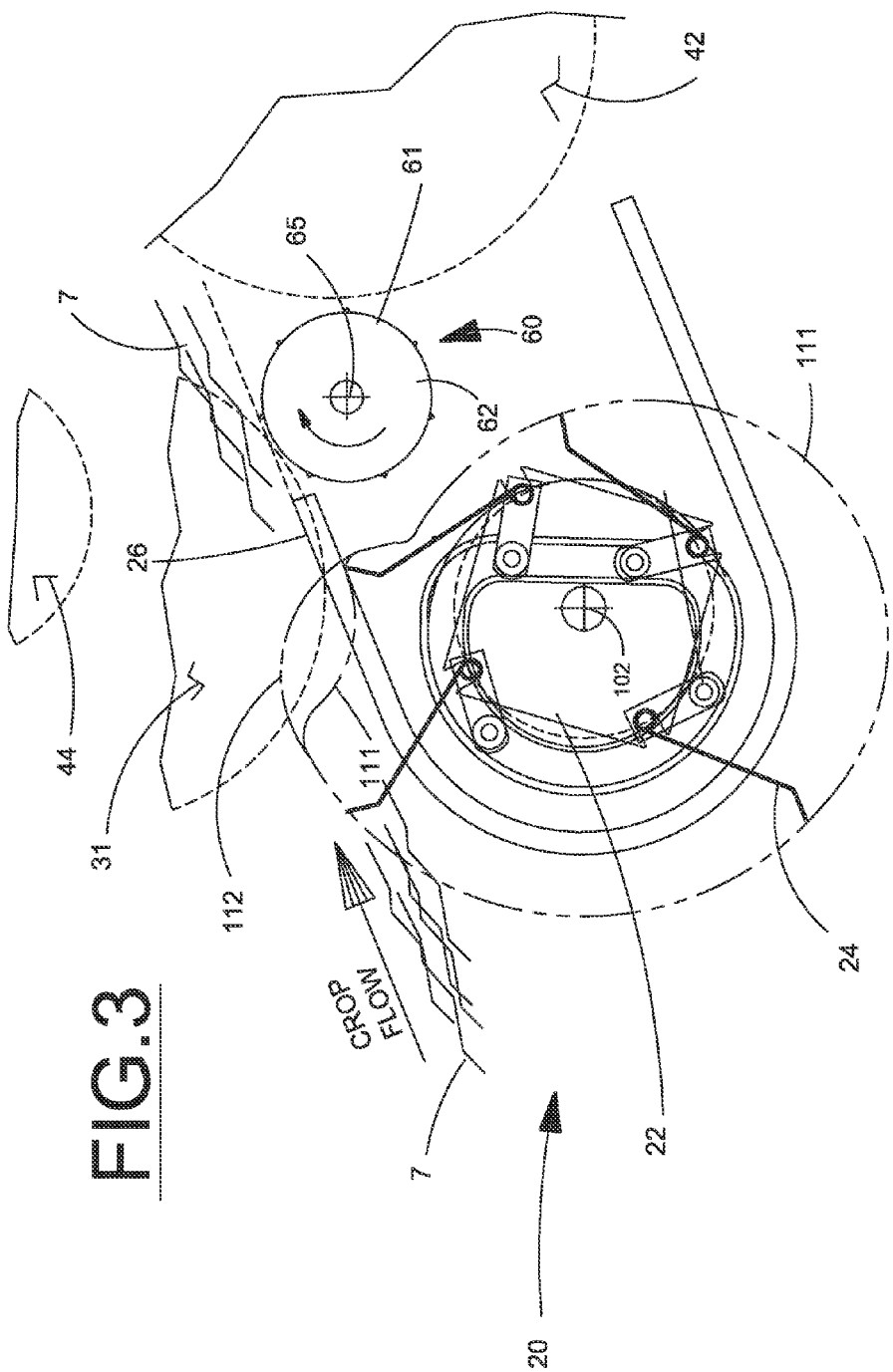
FIG. 3 is a partial side view of the pickup assembly of FIG. 2 showing the spatial relationship between various rotating elements of the pickup assembly and a first embodiment of the secondary feed roll of the present invention.

Referring specifically to FIG. 3, a first embodiment of the secondary feed conveyor 60 is shown comprising a secondary feed roll 61 having an operating surface 62 which is positioned to tangentially interact with the crop mat traveling across the generally planar feed table 26 as the crop reaches the rearward end 27 of the feed table, propelled by movement of tines 24 and the rotating tine reel 22. The secondary feed roll 61 rotates in the direction shown about transverse axis 65 which positions operating surface 62 so that it tangentially interacts with the lower side of the crop material at a position generally below and slightly behind the converging apparatus 30. Operating surface 62 may include a high friction covering, irregular surface texture, or raised features which engage the crop mat 7 and allow the secondary feed roll 61 to urge the crop mat rearwardly into contact with the surface of the floor roll 42 so that it is drawn into the bale chamber.

Secondary feed roll 61 extends laterally for approximately the width of the bale chamber inlet opening. A secondary feed roll laterally extending beyond the inlet opening width places the secondary feed roll 61 in the zone of crop influence of the converging augers 31 and may interfere with the desired crop movement from the convergers. A secondary feed roll 61 having a width significantly less than the width of the crop inlet 91 will be less effective. Crop material laterally discharged from the converging augers may be directed to an area ahead of the inlet 91 in which no additional rearward driving force is provided. The likelihood of crop jamming increases in such circumstances and is to be avoided.

The distance separating the tine reel axis 102 and the floor roll 42 is minimized through the use of a cam and linkage which retracts the tines 24 in the portion of their rotational arc forwardly adjacent to the secondary feed roll 61 to prevent contact with the roll. The path of the tine ends is illustrated as tine path 111 in FIGS. 3 and 4. Similar tine movement is necessary to avoid contact between the tines 24a and the outboard situated converging augers 31. A single cam may be used in the tine reel 22 to produce a single tine path 111 that prevents tine contact with the outboard augers 31 and the secondary feed roll 61. Alternatively, a tine reel having two distinct tine paths could allow tines forwardly adjacent to the secondary feed roll 61 to remain extended for a greater portion of the total tine reel rotation (shown as tine path 112 in FIGS. 3 and 4 and tines 24b in HG. 5) so that crop is more forcefully propelled toward the secondary feed roll 61 and ultimately the bale chamber inlet 91.

Figure 4:
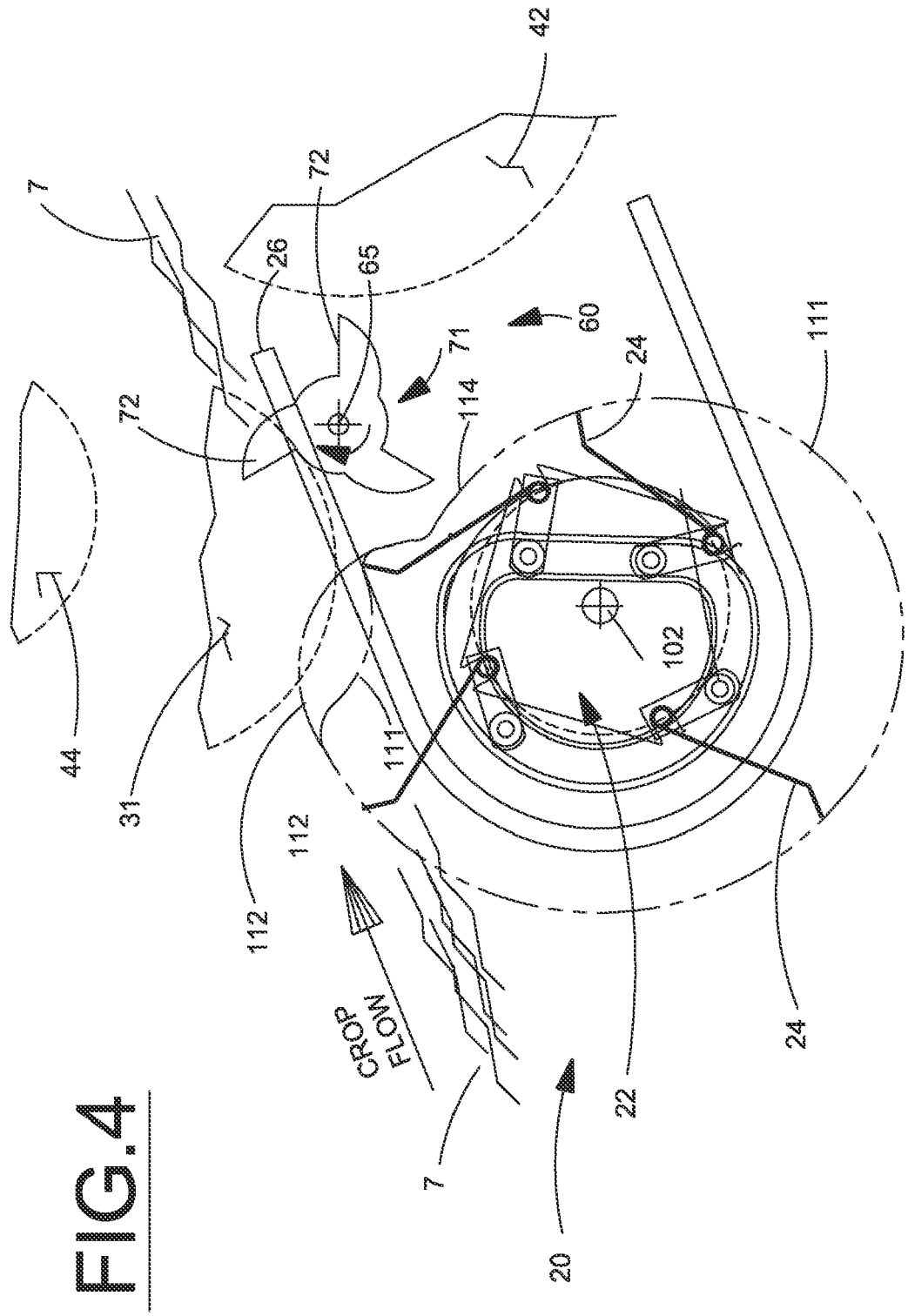
FIG. 4 is a partial side view of the pickup assembly of FIG. 2 showing the spatial relationship of the various rotating elements and a second embodiment of the secondary feed roll of the present invention.
Figure 5:
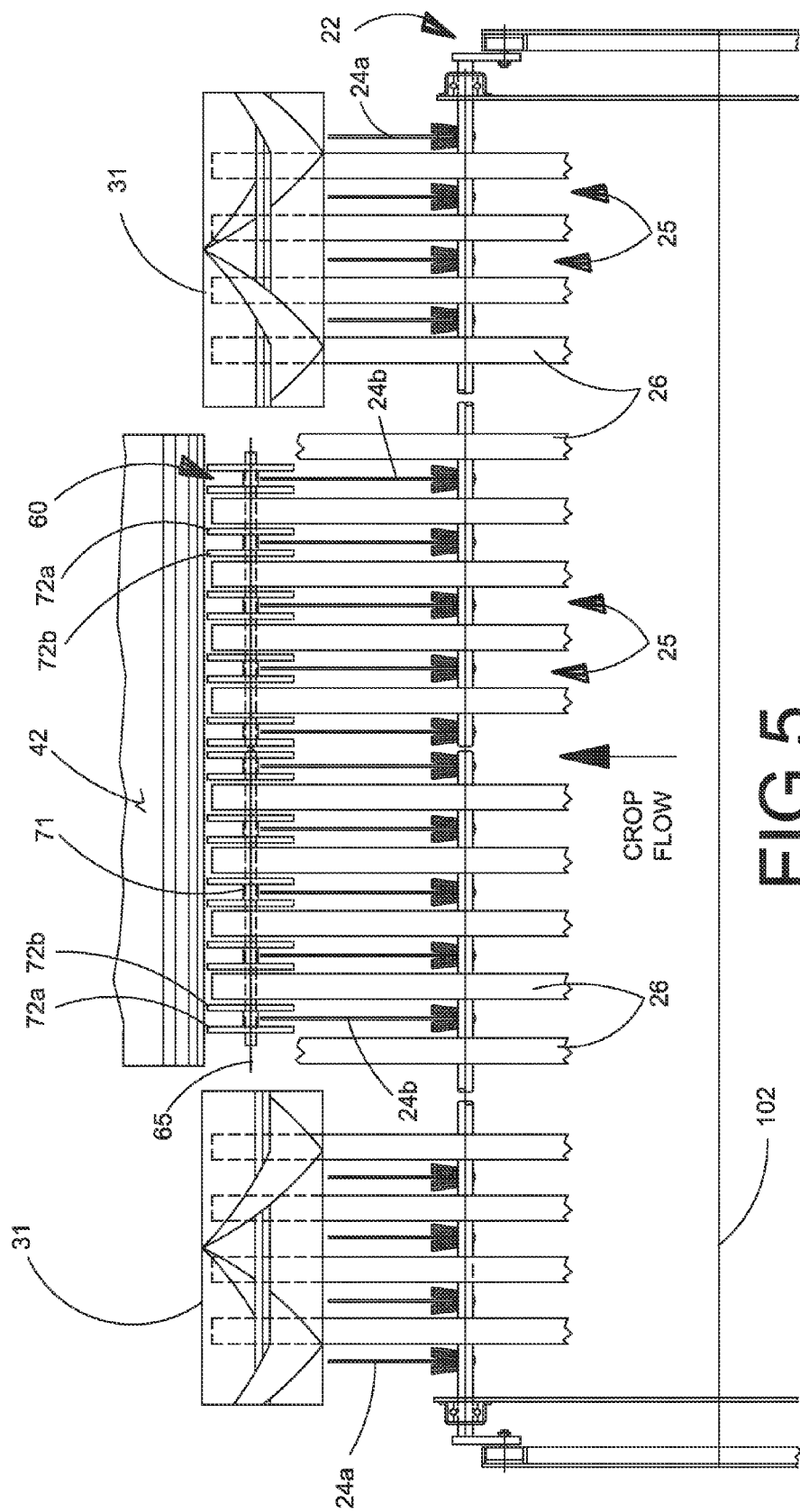
FIG. 5 is a partial plan view of the pickup assembly of FIG. 5 showing the lateral and longitudinal relationships of the various rotating elements of the pickup assembly and the secondary feed roll.

Now referring to FIG. 4 wherein a second embodiment of the secondary feed conveyor 60 is shown comprising a secondary finger reel 71 having a plurality of generally radially feed fingers 72 spaced apart along the transverse width of the finger reel 71. Secondary finger reel 71 is positioned along transverse axis 65 forward of the floor roll 42 and rearward from the tine reel 22. The secondary finger reel 71 is vertically positioned relative to the feed table 26 so that the fingers 72 will extend through openings 25 in the feed table 26 and engage the crop material above to urge the crop material rearwardly into contact with the surface of the floor roll 42 so that it is drawn into the bale chamber. The transverse axis 65 is positioned slightly rearwardly from the above lateral axis of the crop converging apparatus 30 when viewed in the perpendicular to the plane of the feed table to intermediately position the secondary finger reel 71 between the tine reel 22 and the floor roll 42 and provide more uniform crop movement toward the inlet opening 91.

As with the alternate embodiment, the secondary finger reel 71 laterally spans generally the width of the inlet opening 91. Crop material laterally discharged from the converging augers is directed to an area ahead of the inlet opening 91 where it subject to the crop movement influence of the secondary feed conveyor 60. Additional crop movement influence of the tines 24 is achieved by providing spaced-apart pair of feed fingers 72 between which a tine 24b is allowed to pass. Refer specifically to tine path 114 shown in FIG. 4 and the relative arrangement of tines 24b and feed fingers 72 in FIG. 5. The overlap between the tines 24b and the feed fingers 72 provides a continuous urging force on the crop mat further improving crop flow. The opposing relative directions of movement of the tines 24b and the feed fingers 72 near the overlap area (path 114) also improves crop stripping so that crop material is not trapped between the tines 22 and the feed table 26 as the tine passes through the plane of the feed table 26.

The overlap between the tines 24b and the feed fingers 72 is further enhanced by a split finger arrangement wherein laterally adjacent pair of fingers 72a, 72b are spaced-apart sufficiently to allow a tine 24 to pass through the annular space 73, but sufficiently close to allow the pair of feeder fingers 72a, 72b to extend through a single opening 25 in the feed table 26. The split finger arrangement improves crop stripping from the tines 24b as they approach the upper surface of the feed table 26 and reduce the likelihood of crop jamming or clogging.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A crop pickup assembly for a round baler, the baler having a frame-supported bale chamber with a crop inlet opening defined by a floor roll, a generally parallel and spaced apart starter roll, and a pair of generally spaced-apart side walls, the crop inlet opening configured to receive a mat of crop material from the pickup assembly, the pickup assembly having a width bounded by generally opposing outboard ends that is greater than the inlet opening, the crop pickup assembly comprising:

a crop pickup apparatus forwardly connected to the baler, said pickup apparatus configured to lift crop material from the ground and convey a mat of crop material rearwardly toward said crop inlet, said pickup apparatus having a pickup width greater than said inlet width;

a feed table rearward of the crop pickup apparatus and configured to receive and support the crop mat, wherein the feed table includes a generally planar surface extending toward the inlet opening;

right and left side crop convergers arranged on a transverse axis, one said converger positioned adjacent each outboard end of said pickup assembly and configured to urge the crop mate generally laterally inwardly; and an elongate feed assist roll arranged for rotation on a lateral axis, the lateral axis located beneath the feed table and transverse axis of rotation of the crop convergers and longitudinally positioned between said tine reel and the crop inlet opening rearward of the axis of rotation of the crop convergers, said lateral axis and said transverse axis being non-collinear, wherein a portion of said feed assist roll extends at least to the plane of the feed table when the roll in in a first position and configured to urge, by rotation of said feed assist roll, crop material from said tine reel and said right and left crop convergers toward said crop inlet opening.

2. The pickup assembly of claim 1, wherein said feed assist roll further comprises a plurality of generally radially extending fingers laterally spaced apart along the length of said feed assist roll wherein the portion of the feed assist roll is at least a portion of radially extending fingers which.

3. The pickup assembly of claim 2, wherein said crop pickup apparatus further comprises a plurality of generally radially extending and laterally spaced-apart tines configured to rotate about a reel axis and said plurality of radially extending fingers laterally interlace with said plurality of tines.

4. The pickup assembly of claim 3, wherein each of said plurality of radially extending fingers is split to define an annular space between laterally adjacent fingers, wherein a path of rotation of the at least one of the tines extends overlaps with a path of rotation of the fingers within the annular space.

5. The pickup assembly of claim 1, wherein said feed assist roll has a peripheral surface having at least one of a high-friction covering, irregular surface texture, or raised features positioned to frictionally engage the crop mat and urge the mat toward the crop inlet opening.

6. The pickup assembly of claim 5, wherein said peripheral surface is generally tangentially aligned with said feed table planar surface in at least the first position.

7. A crop pickup assembly for a round baler, the baler having a frame-supported bale chamber with a crop inlet opening having a transverse width and configured to receive a mat of crop material from the pickup assembly into the bale chamber, the pickup assembly having a width bounded by generally opposing outboard ends that is greater than the inlet opening width, the crop pickup assembly comprising:

a forwardly disposed tine reel having a plurality of tines configured to lift crop material from the ground and feed the mat of crop material rearwardly by rotation of said tine reel;

a feed table configured to receive the crop mat from said tine reel and support the crop mat during movement toward the inlet opening, said feed table having a plurality of generally parallel and spaced apart openings through which said plurality of tines partially extend depending upon rotational position of said tine reel;

right and left side crop convergers arranged on a transverse axis, one said converger positioned adjacent each outboard end of said pickup assembly and configured to urge the crop mate generally laterally inwardly; and an elongate feed assist roll arranged for rotation on a lateral axis, the lateral axis located beneath the feed table and transverse axis of rotation of the crop convergers and longitudinally positioned between said tine reel and the crop inlet opening rearward of the axis of rotation of the crop convergers, said lateral axis and said transverse axis being non-collinear, said feed assist roll further having a plurality of generally radially extending fingers laterally spaced apart along the length of said feed assist roll, said plurality of fingers having a path of rotation that extends upward from below the feed table into a crop flow path from the tines.

8. The pickup assembly of claim 7, wherein said plurality of radially extending fingers laterally interlace with said plurality of tines.

9. The pickup assembly of claim 8, wherein each of said plurality of radially extending fingers is split to define an annular space between laterally adjacent fingers, wherein the path of rotation of the at least one of the tines extends overlaps with the path of rotation of the fingers within the annular space.

10. A crop pickup assembly for a round baler, the baler having a frame-supported bale chamber with a crop inlet opening having a transverse width and configured to receive a mat of crop material from the pickup assembly into the bale chamber, the pickup assembly having a width bounded by generally opposing outboard ends that is greater than the inlet opening width, the crop pickup assembly comprising:

a crop pickup apparatus forwardly connected to the baler, said pickup apparatus configured to lift crop material from the ground and convey a mat of crop material rearwardly toward said crop inlet, said pickup apparatus having a pickup width greater than said inlet width;

a feed table including a generally planar surface rearward of the pickup for receiving the crop mat from said pickup apparatus and support the crop mat during movement toward the inlet opening;

right and left side crop convergers arranged on a transverse axis, one said converger positioned adjacent each outboard end of said pickup assembly; and an elongate feed assist roll arranged for rotation on a fixed lateral axis, the lateral axis located beneath the feed table and transverse axis of rotation of the crop convergers and longitudinally positioned between said tine reel and the crop inlet opening rearward of the axis of rotation of the crop convergers, said lateral axis and said transverse axis being non-collinear, said feed assist roll having a peripheral surface configured to extend at least to the plane of the feed table when the roll is in a first position and to frictionally contact crop in a crop flow path along the feed table between the pickup and the crop inlet opening.

11. The pickup assembly of claim 10, wherein said feed assist roll surface comprises at least one of a high-friction covering, irregular surface texture, or raised features.

12. The pickup assembly of claim 11, wherein said feed table further comprises a trailing end and said feed assist roll is rearwardly disposed from said trailing end.

13. The pickup assembly of claim 12, wherein said peripheral surface is generally tangentially aligned with said feed table planar surface.

* * * * *